US012432426B2

(12) United States Patent
Linsey et al.

(10) Patent No.: US 12,432,426 B2
(45) Date of Patent: Sep. 30, 2025

(54) AUTOMATED VIDEO SEGMENTING AND INTEGRATION OF VIDEO SEGMENTS INTO DIGITAL COMMUNICATIONS

(71) Applicant: Dell Products L.P., Round Rock, TX (US)

(72) Inventors: David J. Linsey, Marietta, GA (US); Gregory Michael Ramsey, Seattle, WA (US)

(73) Assignee: Dell Products L.P., Round Rock, TX (US)

( * ) Notice: Subject to any disclaimer, the term of this patent is extended or adjusted under 35 U.S.C. 154(b) by 129 days.

(21) Appl. No.: 18/139,137

(22) Filed: Apr. 25, 2023

(65) Prior Publication Data

US 2024/0364980 A1  Oct. 31, 2024

(51) Int. Cl.
*H04N 21/845* (2011.01)
*G06V 20/40* (2022.01)
*H04N 21/2343* (2011.01)
*H04N 21/258* (2011.01)

(52) U.S. Cl.
CPC ......... *H04N 21/8456* (2013.01); *G06V 20/49* (2022.01); *H04N 21/234309* (2013.01); *H04N 21/25891* (2013.01)

(58) Field of Classification Search
CPC ....... H04N 21/8456; H04N 21/234309; H04N 21/25891; G06V 20/49
See application file for complete search history.

(56) References Cited

U.S. PATENT DOCUMENTS

| 2009/0132924 | A1* | 5/2009 | Vasa ................... H04N 5/76 715/723 |
| 2013/0097644 | A1* | 4/2013 | Brande ............. H04N 21/8586 725/93 |
| 2021/0176289 | A1* | 6/2021 | Franklin ............ G06F 21/1015 |

OTHER PUBLICATIONS

I. Ahmad et al., "Video Transcoding: An Overview of Various Techniques and Research Issues," IEEE Transactions on Multimedia, vol. 7, No. 5, Oct. 2005, pp. 793-804.

(Continued)

*Primary Examiner* — Girumsew Wendmagegn
(74) *Attorney, Agent, or Firm* — Ryan, Mason & Lewis, LLP

(57) ABSTRACT

An apparatus comprises a processing device configured to identify and parse a video tag associated with a video to determine configuration parameters for a video segment to be generated from the video, the determined configuration parameters comprising a specification of a time range for the video segment and an intended recipient thereof. The processing device is also configured to generate the video segment in accordance with the determined configuration parameters, and to select one or more digital communication formats for sending the generated video segment to the intended recipient, the one or more digital communication formats being selected based at least in part on at least one of (i) one or more user preferences associated with the intended recipient and (ii) the determined configuration parameters. The processing device is further configured to send the generated video segment to the intended recipient via the selected one or more digital communication formats.

20 Claims, 8 Drawing Sheets

(56) References Cited

OTHER PUBLICATIONS

I. Koprinska et al., "Temporal Video Segmentation: A Survey," Signal Processing: Image Communication vol. 16, No. 5, Jan. 2001, pp. 477-500.

Scopi Tech, "How Do you Tag Someone in a YouTube Comment: A Step-by-Step Guide!" https://scopitech.com/how-do-you-tag-someone-in-a-youtube-comment-a-step-by-step-guide/#:~:text=To%20tag%20someone%2C%20put%20the,their%20username%20before%20your%20comment, Accessed Apr. 20, 2023, 6 pages.

* cited by examiner

300

From: Jane Doe

Subject: Recent Project Strategy

John, I'm not sure if you were on the recent project review call but at one point there was a critical callout of expectations for our work by the leadership. What are your thoughts? I've linked the recording below.

https://videos.company.com?video-B3cA3

AUTOMATED VIDEO SEGMENTING AND INTEGRATION OF VIDEO SEGMENTS INTO DIGITAL COMMUNICATIONS

FIELD

The field relates generally to information processing, and more particularly to data processing in information processing systems.

BACKGROUND

As the value and use of information continues to increase, individuals and businesses seek additional ways to process and store information. Information processing systems may be used to process, compile, store and communicate various types of information, including rich media content such as videos. As connectivity among computing, storage and networking devices within and across different information processing systems continues to proliferate, communication of rich media content including videos is becoming more prevalent. For example, videoconferencing and video calling have increased in popularity. Sharing and storing recordings of videoconferences and video calls presents various challenges in information processing systems.

SUMMARY

Illustrative embodiments of the present disclosure provide techniques for automated video segmenting and integration of video segments into digital communications.

In one embodiment, an apparatus comprises at least one processing device comprising a processor coupled to a memory. The at least one processing device is configured to identify a video tag associated with a video and to parse the identified video tag to determine configuration parameters for a video segment to be generated from the video, the determined configuration parameters comprising a specification of a time range for the video segment and an intended recipient of the video segment. The at least one processing device is also configured to generate the video segment in accordance with the determined configuration parameters, and to select one or more digital communication formats for sending the generated video segment to the intended recipient, the one or more digital communication formats being selected based at least in part on at least one of (i) one or more user preferences associated with the intended recipient and (ii) the determined configuration parameters. The at least one processing device is further configured to send the generated video segment to the intended recipient via the selected one or more digital communication formats.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
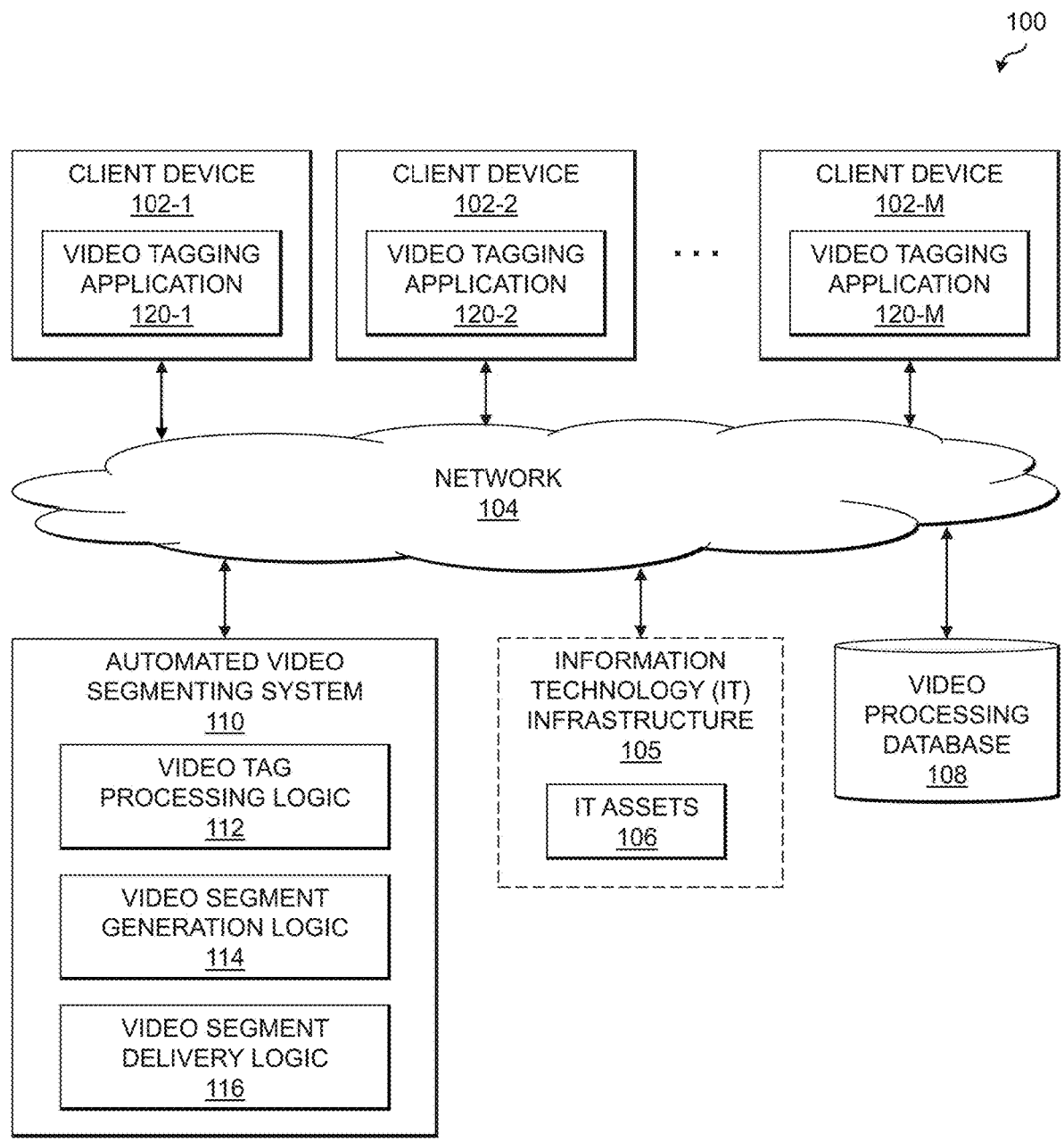
FIG. 1 is a block diagram of an information processing system configured for automated video segmenting and integration of video segments into digital communications in an illustrative embodiment.

FIG. 1 shows an information processing system 100 configured in accordance with an illustrative embodiment. The information processing system 100 is assumed to be built on at least one processing platform and provides functionality for automated and intelligent segmenting of videos and other rich media, and for contextual integration of video segments into digital communications. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, a video processing database 108, and an automated video segmenting system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the automated video segmenting system 110 is used for an enterprise system. For example, an enterprise may subscribe to or otherwise utilize the automated video segmenting system 110 for managing creation and communication of video segments on behalf of users of the enterprise (e.g., employees, customers, etc. which may be associated with different ones of the client devices 102 and/or IT assets 106 of the IT infrastructure 105). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The video processing database 108 is configured to store and record various information that is utilized by the automated video segmenting system 110 for segmenting videos and for integrating video segments into digital communications. The video processing database 108, for example, may store videos to be segmented, video segments which are produced using the automated video segmenting system 110, transcoding options or settings for use in segmenting videos for particular types of digital communications and/or for different types of target devices, etc. In some embodiments, one or more of storage systems utilized to implement the video processing database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the automated video segmenting system 110, as well as to support communication between the automated video segmenting system 110 and other related systems and devices not explicitly shown.

The automated video segmenting system 110 may be provided as a cloud service that is accessible by one or more of the client devices 102 to allow users thereof to generate and communicate video segments (e.g., to other ones of the client devices 102 and/or the IT assets 106), to store generated video segments (e.g., in the video processing database 108, on one or more of the client devices 102, one or more of the IT assets 106, etc.). In some embodiments, the IT assets 106 of the IT infrastructure 105 are owned or operated by the same enterprise that operates the automated video segmenting system 110. In other embodiments, the IT assets 106 of the IT infrastructure 105 may be owned or operated by one or more enterprises different than the enterprise which operates the automated video segmenting system 110 (e.g., a first enterprise provides support for video segmenting for multiple different customers, business, etc.). Various other examples are possible.

In some embodiments, the client devices 102 and/or the IT assets 106 of the IT infrastructure 105 may implement host agents that are configured for automated transmission of information regarding videos to be segmented. Such information may include, for example, video "tags" produced using video tagging applications 120-1, 120-2, . . . 120-M (collectively, video tagging applications 120) running on the client devices 102. The video tagging applications 120 may comprise or be associated with video viewers, where users of the client devices 102 may comment, enter or otherwise generate video tags which are communicated to the automated video segmenting system 110 for processing (e.g., to generate video segments, and to communicate the generated video segments to specific destinations, etc.). It should be noted that a "host agent" as this term is generally used herein may comprise an automated entity, such as a software entity running on a processing device. Accordingly, a host agent need not be a human entity.

The automated video segmenting system 110 in the FIG. 1 embodiment is assumed to be implemented using at least one processing device. Each such processing device generally comprises at least one processor and an associated memory, and implements one or more functional modules or logic for controlling certain features of the automated video segmenting system 110. In the FIG. 1 embodiment, the automated video segmenting system 110 implements video tag processing logic 112, video segment generation logic 114, and video segment delivery logic 116. The video tag processing logic 112 is configured to receive or detect when video files are tagged (e.g., by users of the client devices 102 utilizing the video tagging applications 120). The video tag processing logic 112 is configured to parse the tags to determine how video files are to be segmented (e.g., target recipients of video segments, start and end times for video segments, a delivery or notification method for video segments, transcoding settings for video segments, etc.). The video segment generation logic 114 is configured to utilize the information determined from parsing the tags to generate one or more video segments. For example, a given video segment is generated according to the start and end times specified in a given video tag. The video segment generation logic 114 may apply transcoding settings in generating the given video segment, where the transcoding settings may be specified in the given video tag. The transcoding settings may be associated with different quality levels (e.g., low, medium, high) which correspond to different resolutions, framerates, target file sizes, etc. The transcoding settings, if not directly specified in the given video tag, may be inferred or derived from a delivery or notification method specified in the given video tag (e.g., email, text messaging, instant messaging, etc.), a target device that the given video segment is to be delivered to, user preferences associated with a target recipient specified in the given video tag. The video segment delivery logic 116 is configured to deliver generated video segments to the target recipients in accordance with delivery and notification settings specified in the video tags. In some cases, a link is provided where a target recipient can access a given video segment (e.g., where the link when selected brings the user directly to the target range of a video specified by start and end times of the given video tag). In other cases, a given video segment is downloaded directly to a sender or recipient. The video segment delivery logic 116 may insert the link to the given video segment, or attach the given video segment file itself, in one or more messages which are pre-populated with target recipient information determined from the video tags.

It is to be appreciated that the particular arrangement of the client devices 102, the IT infrastructure 105, the video processing database 108 and the automated video segmenting system 110 illustrated in the FIG. 1 embodiment is presented by way of example only, and alternative arrangements can be used in other embodiments. As discussed above, for example, the automated video segmenting system 110 (or portions of components thereof, such as one or more of the video tag processing logic 112, the video segment generation logic 114, and the video segment delivery logic 116) may in some embodiments be implemented internal to one or more of the client devices 102 and/or the IT infrastructure 105.

At least portions of the video tag processing logic 112, the video segment generation logic 114, and the video segment delivery logic 116 may be implemented at least in part in the form of software that is stored in memory and executed by a processor.

The automated video segmenting system 110 and other portions of the information processing system 100, as will be described in further detail below, may be part of cloud infrastructure.

The automated video segmenting system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the video processing database 108 and the automated video segmenting system 110 or components thereof (e.g., the video tag processing logic 112, the video segment generation logic 114, and the video segment delivery logic 116) may be implemented on respective distinct processing platforms, although numerous other arrangements are possible. For example, in some embodiments at least portions of the automated video segmenting system 110 and one or more of the client devices 102, the IT infrastructure 105 and/or the video processing database 108 are implemented on the same processing platform. A given client device (e.g., 102-1) can therefore be implemented at least in part within at least one processing platform that implements at least a portion of the automated video segmenting system 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the video processing database 108 and the automated video segmenting system 110, or portions or components thereof, to reside in different data centers. Numerous other distributed implementations are possible. The automated video segmenting system 110 can also be implemented in a distributed manner across multiple data centers.

Additional examples of processing platforms utilized to implement the automated video segmenting system 110 and other components of the information processing system 100 in illustrative embodiments will be described in more detail below in conjunction with FIGS. 6 and 7.

It is to be understood that the particular set of elements shown in FIG. 1 for automated video segmenting and integration of video segments into digital communications is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
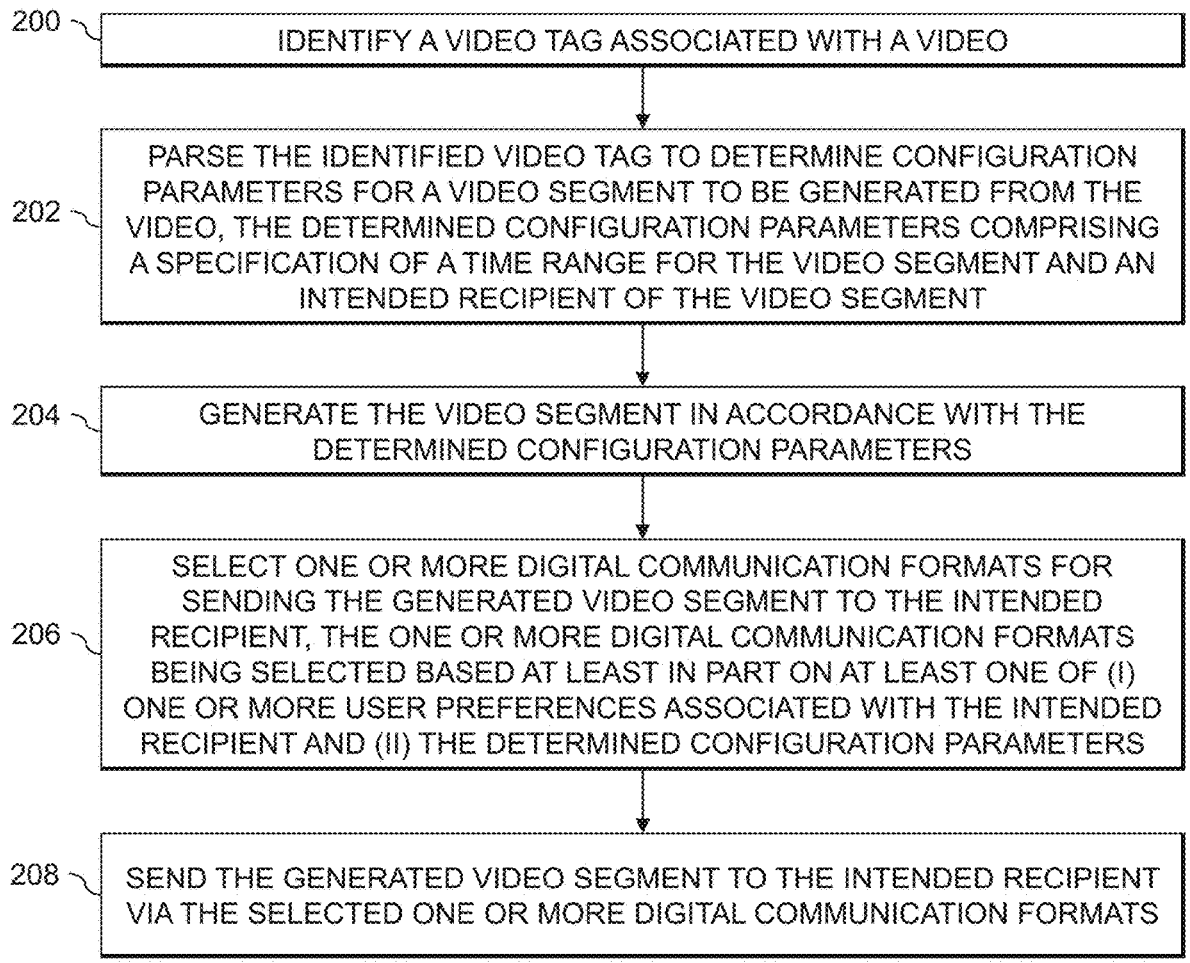
FIG. 2 is a flow diagram of an exemplary process for automated video segmenting and integration of video segments into digital communications in an illustrative embodiment.

An exemplary process for automated video segmenting and integration of video segments into digital communications will now be described in more detail with reference to the flow diagram of FIG. 2. It is to be understood that this particular process is only an example, and that additional or alternative processes for automated video segmenting and integration of video segments into digital communications may be used in other embodiments.

In this embodiment, the process includes steps 200 through 208. These steps are assumed to be performed by the automated video segmenting system 110 utilizing the video tag processing logic 112, the video segment generation logic 114, and the video segment delivery logic 116. The process begins with step 200, identifying a video tag associated with a video. Step 200 may comprise detecting creation of a video tag in a video tagging application on a client device. The video tagging application may comprise a plugin associated with a video viewer application running on the client device.

In step 202, the identified video tag is parsed to determine configuration parameters for a video segment to be generated from the video. The determined configuration parameters comprise a specification of a time range for the video segment and an intended recipient of the video segment. The specified time range for the video segment may be defined relative to a current video position of the video in a video viewer application running on a client device. The specified time range for the video segment may comprise a bounded time range from a first time prior to the current video position of the video in the video viewer application running on the client device and a second time subsequent to the current video position of the video in the video viewer application.

The video segment is generated in step 204, in accordance with the configuration parameters determined by parsing the video tag in step 202. One or more digital communication formats for sending the generated video segment to the intended recipient are selected in step 206. The one or more digital communication formats may be selected based at least in part on at least one of (i) one or more user preferences associated with the intended recipient and (ii) the determined configuration parameters. The generated video segment is then sent to the intended recipient in step 208 via the one or more digital communication formats selected in step 206.

Step 204 may comprise generating a uniform resource identifier (URI) (e.g., a uniform resource locator (URL) or another link) for accessing the video segment within the video. Selection of the uniform resource identifier automatically navigates a video viewer application to the specified time range. The URI may include starting and ending timestamps of the specified time range for the video segment (e.g., in plain text, encrypted or encoded versions thereof, etc.). The URI may alternatively include a data source lookup string (e.g., for accessing metadata within a video file specifying starting and ending timestamps of the specified time range for the video segment, for accessing a database record specifying the starting and ending timestamps of the specified time range for the video segment, etc.).

In some embodiments, step 204 comprises generating a separate video file for the video segment. Generating the separate video file may comprise applying transcoding settings to the video. The transcoding settings may be specified as part of the configuration parameters of the video tag. The transcoding settings may also or alternatively be selected based at least in part on user preferences associated with one or more devices of the intended recipient, based at least in part on the selected digital communication format, etc. Sending the generated video segment to the intended recipient in step 208 may comprise at least one of: downloading the separate video file for the video segment; and generating a URI for accessing the separate video file, wherein selection of the URI initiates downloading of the separate video file.

As the world expands its connectivity, video devices continue to proliferate and bandwidth is increasing, such that communication in video form is becoming more prevalent. For example, on YouTube alone over 500 hours of video content are uploaded every minute. Further, there has been a massive increase in video calling, with many of the video calls being recorded as well.

Sharing textual content is simple, with numerous online and offline modes available (e.g., web pages, file sharing, instant messaging, email, text messaging, etc.). In these modes, it is easy to provide small segments of the textual content, sharing only what is needed (e.g., using simple copy and paste operations). Video content is harder to share. Not only are video files massive (e.g., in comparison to text files), but video files can be harder to wade through to find the correct content to share. Once the correct content is found within one or more video files, sharing just the relevant portions is not possible without leveraging video editor applications or software which may be difficult to use. Most typical users will not be versed in how to use such video editor applications, and even if the users were, the time investment and computing resources required to segment a video file may not be worth it. This severely limits the benefits of video communications. Illustrative embodiments provide technical solutions which enable users of any skill level to be able to share segments of videos, with a similar outcome as to how such users are able to share textual content.

As noted above, video communication has exploded in recent years. However, for many users, especially less technically savvy users, videos are not as user-friendly for sharing compared to textual content. Users may be frustrated when they try (and often fail) to email massive video files to a friend, colleague or other user. In the corporate world, as an example, a recorded video meeting may have only small sections which are relevant for certain audiences and users may be stumped as to how to only share part of the recorded video meeting.

Figures 3A, 3B:
FIGS. 3A and 3B show examples of digital communications in which videos are communicated, according to an illustrative embodiment.

Sharing bookmarked locations within a video can be useful. Such an approach, however, still involves sharing the content of the entire video which may not be desired for various reasons such as file size, wanting to reduce distractions of the rest of a video from the viewer, security reasons related to the rest of the video content, etc. Additionally, users may want to share only parts of a corporate communication or other video, or even to save parts of a video for themselves to refer to in the future without saving the entire video. Even with the always online and cloud-based nature of data storage, having the ability to easily distribute video segments for offline viewing still has value. For example, it can be frustrating to be reviewing email when traveling (e.g., on an airplane or through one or more areas with limited connectivity where Internet service is unavailable or unreliable), only to come across a link to additional content (e.g., a video file) which cannot be accessed. FIG. 3A shows an example of a message 300 (e.g., a corporate email) with an entire video recording linked therein, which is inaccessible to the viewer while offline. While full recordings may of course be attached to messages such as emails, downloading and sharing an entire recording is difficult as the entire recording can be massive. This can also be frustrating and difficult for both the sender and the receiver (e.g., such as email messages bouncing due to too large email attachments). FIG. 3B shows an example of a message 350 (e.g., a corporate email) which has a massive video attachment (e.g., an 80 megabyte (MB) video file) attached thereto, which may bounce or fill up the recipient's mailbox.

While it is possible for technically savvy users to segment video files into only the content which is relevant for a particular use case, this is a cumbersome and resource-intensive process which may require downloading an entire video file (e.g., which may be very large), leveraging a separate video editing tool, selecting a correct transcoding profile to use which is appropriate for the target delivery medium, etc. Even for the most skilled of users, such an approach takes significant time and resources to accomplish. Such required time, technology and resource investment reduces the shareability and value of video content. By providing more familiar "copy and paste" type functionality, the technical solutions described herein enable sharing segments of videos by less skilled users and with lower resource requirements. This advantageously increases the user community and value added by the increasing amount of video content which is produced.

Consider a one-hour recording of a video conference. It may be desired to only share five minutes of the recording with another colleague or other user. Accomplishing this, however, is not easy. The desire to share only five minutes of the one-hour video conference recording (or some other limited portion of a video) may be for various reasons, such as relevance (e.g., where a particular recipient may only be interested in some limited portion of a video), security (e.g., to redact sensitive or privileged portions of a video which a recipient is not entitled to access), etc. In text-based communication, sharing a limited portion of the textual content can be as simple as deleting any unneeded portions of the textual content. For videos, however, this is not easy and requires multiple steps and significant resources (e.g., computing or processing resources, storage resources, bandwidth resources, etc.).

A conventional process for segmenting a video includes downloading the entire video file (e.g., a video conference recording), which can be more onerous than it may seem. On average, a voice plus screen sharing recording make take up 20 MB or more storage space per hour, while adding in a single live video stream can bring thus up to 200 MB per hour or more. Further, some recordings may have multiple point-of-view options (e.g., speaker view, gallery view, etc.) which can spike this into multiple gigabytes (GB) per hour. Next, a video editor must be downloaded and installed. Some operating systems (OSes) may include a built-in video editor, but not all do. This can also be more onerous than it may seem as the users who wish to segment video may not be technically savvy. Users run the risk of downloading malware-infected free products if they start searching for a "free video editor" on the Internet. Additionally, corporate or other enterprise policies may simply prevent the installation of such software, stopping this workflow completely in a corporate or other enterprise environment.

A user must then open the video in the video editor and find the segment of the video which is desired to be shared or saved. If a given recording has multiple points of view, this will also require finding the appropriate video file or stream. The user must then set the transcoding for the output based on a desired destination medium, and extract a desired video segment. Many less technically savvy users will not even understand what the transcoding options are, and the video quality and file size will vary based on the selection of the transcoding options thus resulting in some trial and error. The required size for video segments may depend on the communication method being used. For example, sending a video segment via email may require a smaller size than if sharing in an instant message conversation or some other medium. Rights restrictions on video files may cause challenges, or even prevent this step (e.g., video segment extraction) from executing. The resulting segment video file, it if can be obtained, may then be shared through a desired medium or communication method, or may be uploaded if desired to share the video segment online via a link. This entire process can take a significant amount of time and resources to complete (e.g., several hours for a first-time user, tens of minutes or more for users familiar with the process, etc.). Additionally, by creating a derivative video file off of an original video file, this can result in lost metadata including security and retention policies.

Specifying a bounded segment of a video, with both starting and endpoint bookmarked timestamps is not possible using conventional approaches. Workarounds such as modifying a full video file into a derivative video file (e.g., using the time-consuming and resource-intensive process described above) is cumbersome, technically risky, and may violate corporate or other enterprise policies. This makes sharing portions of a video file insurmountably difficult for most users, thus reducing the value of video content. Further, with most content stored online (e.g., in cloud storage), offline viewing of rich media such as video has become increasingly rare and difficult to accomplish. Having a way to share reasonably-sized rich media offline efficiently and effectively allows for increased consumption and realized value.

The technical solutions described herein provide functionality for enhanced video tagging which supports time ranges. Various platforms allow for tagging users (e.g., such as with the @username comment), which will in turn notify those users to draw their attention to the tag and direct them to certain content (e.g., a location within a video). The users may be users in a corporate directory, a local application user-store, email addresses, etc. Such functionality, however, only provides a bookmark to a timestamp in a video—it does not provide a time range of relevance for the tagging or allow fully constraining the tagging (e.g., to restrict user access to a specific time range within a video) if desired. Video tagging may be enhanced to support a plus and/or minus time range relative to a current position in a video. For example, specifying @John.Doe −10 s +10 s in a comment area of a video will result in a bounded time range in the video (e.g., from 10 seconds before the current video position in the video to 10 seconds after the current position in the video).

Figure 4A:
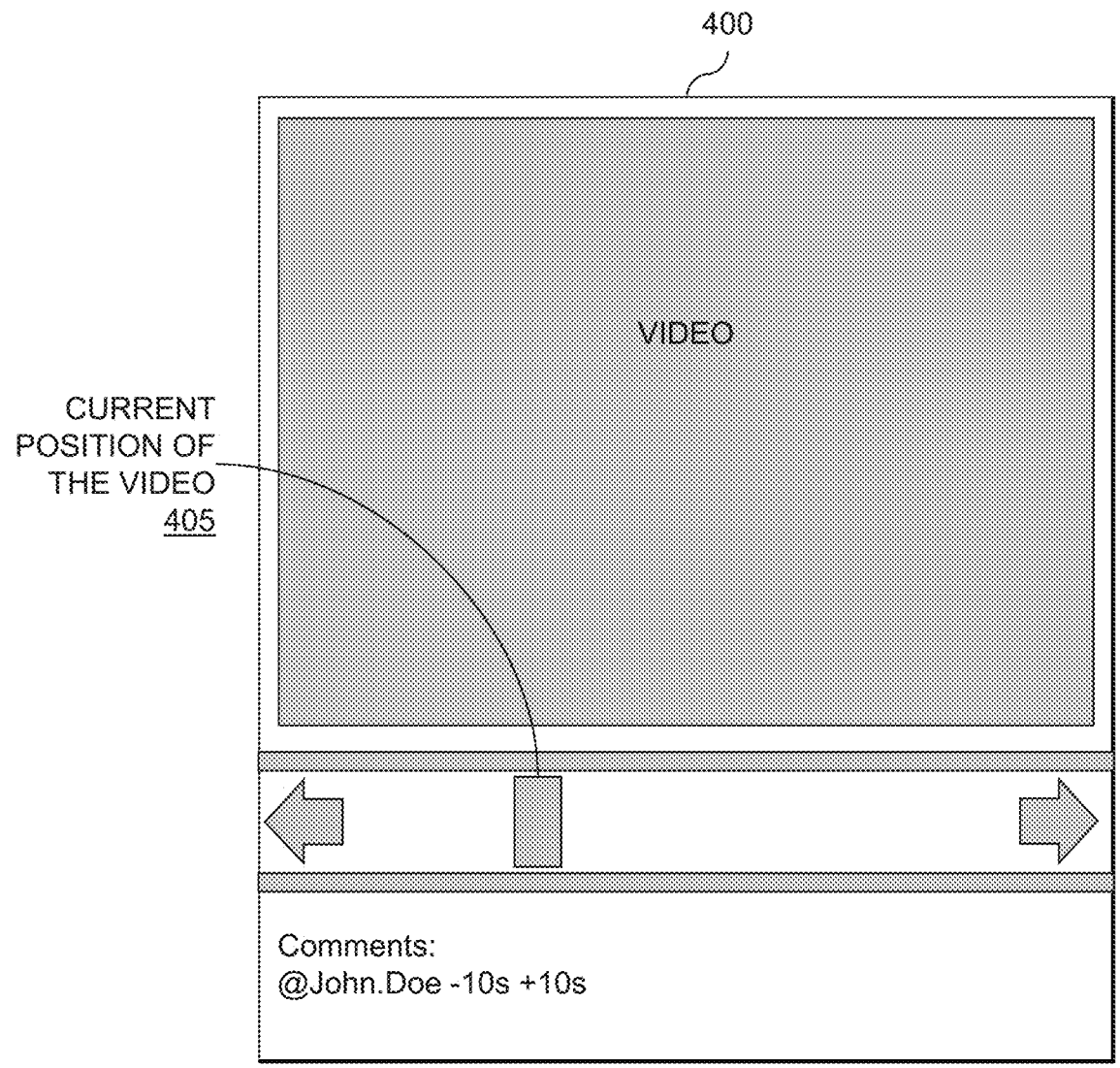
FIGS. 4A and 4B show views of a video editor application configured with enhanced video tagging functionality, according to an illustrative embodiment.

FIG. 4A shows a video viewer 400 in which a current position 405 of the video is tagged with "@John. Doe −10 s +10 s." Specifying "@John.Doe −10 s" will result in a bounded time range in the video from 10 seconds before the current position 405 to the current position 405. Specifying "@John.Doe +10 s" will result in a bounded time range in the video from the current position 405 to 10 seconds after the current position 405. To specify the beginning or end of the video as a bounded position, keywords such as "start" or "end" may be used. For example, "@John. Doe −start" will result in a bounded time range in the video from the start to the current position 405. Specifying "@John.Doe +end" will result in a bounded time range in the video from the current position 405 to the end of the video. Different units may be used for different durations (e.g., s for seconds, m for minutes, h for hours, etc.). Durations may be combined as well, such as specifying "@John.Doe +1 m10 s" to indicate a bounded segment from 1 minute and 10 seconds after the current position 405.

Once the tag is generated, the relative time range based on the current position 405 in the video may be converted behind the scenes to a start and end timestamp in the video to facilitate communication to the tagged user. For example, if the current position 405 is at the 35 second mark in a video with the tag "@John.Doe −10 s +10 s" will generate a start timestamp of 25 seconds into the video and an end timestamp of 45 seconds into the video. The tagged user may be notified of the video segment using various notification platforms (e.g., which may be built in to various software, such as video viewer applications, email or messaging applications, video conferencing applications, etc.). Once the tagged user clicks on the link, additional context may be provided to a server which defines the range. This can be implemented in various forms. In some embodiments, the start and end timestamps may be specified directly in a uniform resource locator (URL) as https://videos.company.com?video=B3cA3&start={timestamp}&end={timestamp}.

Figure 4B:
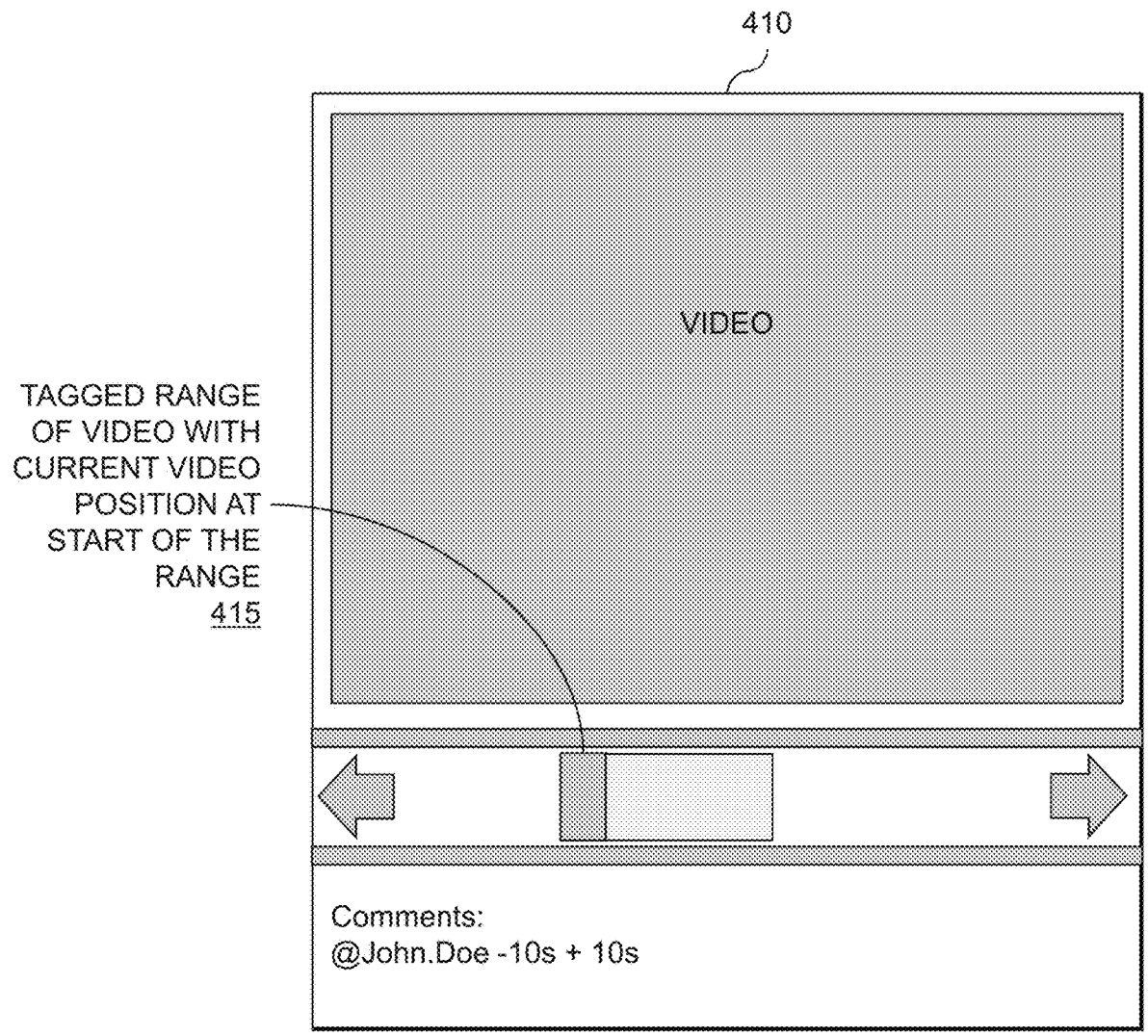

In other embodiments, the timestamp information may need to be presented in a manner where it cannot be manipulated which does not otherwise need to be obscured or wrapped. This information may be encoded server-side using various techniques, with the particular encoding method selected based on a desired level of security and obfuscation of a bookmark identifier (e.g., ranging from an encoding or encryption of a choice of timestamps directly into a URL or other uniform resource identifier (URI), a data source lookup in a database or metadata within the file, etc.). For example, the URL may be https://videos.company.com?video=B3cA3&start={encoded timestamp} &end={encoded timestamp}. As another example, the URL may be encoded as https://videos.company.com?video=B3cA3&bookmark={bookmark ID}. Once the user navigates to their tagged position in the video, they will be presented the video navigated directly to the start timestamp, with the total time range highlighted or otherwise called out, such as via illustration of that range in the navigation bar of the video as shown in FIG. 4B, which shows a video viewer 410 in which a tagged range 415 of a video with the current video position at the start of the range being highlighted in the navigation bar. In the FIG. 4B example, the tagged range is again "@John.Doe −10 s +10 s" though it should be appreciated that various other ranges may be tagged as described elsewhere herein.

The technical solutions described herein may further provide functionality for enhanced video tagging which supports downloading video segments for offline viewing. Building on enhanced video tagging, additional direction can be given to bounded tag to automatically produce a video segment suitable for downloading. For example, specifying "@John.Doe −10 s +10 s download" in the comment area of a video viewer configured with enhanced tagging functionality will result in the total 20 second bounded time range being automatically snipped out of the video, and then only that segment of the video will be sent to a client browser for download by the user who is doing the tagging, or who has been tagged. In this way, the user tagging a video can distribute a video segment file offline (e.g., via email or another communication method) to the tagged user. The tagged user may be notified in the same manner as the URL-based bookmark model described above, though the notification content may differ in that the tagged user will be notified that they have been tagged for an offline video segment. This provides a benefit to the tagged user, such that the tagged user will know that they should be expecting a video segment to be sent to them. This reduces the likelihood that the tagged user will identify the video segment sent to them as junk or malware.

Additional variations of this functionality include specifying a target medium or communication method for download of a video segment. For example, specifying "@John.Doe −10 s +10 s download-email" in the comment area of a video viewer configured with enhanced tagging functionality will result in the total 20 second bounded time range being automatically snipped out of the video, encoded in a model appropriate for email (e.g., a smaller size), and then sent to a client browser for download by the user who is doing the tagging. Additionally, if the tag is for an email address or an identity where an email address is available to the user account doing the tagging (e.g., such as a corporate or other enterprise environment where the tag is a corporate or other enterprise account), in addition to a video download being sent to the client browser, an email (e.g., via the "mailto:" protocol) or other message can also be sent to the client browser, where the message is pre-populated with the tagged user's email address. The user would then just attach the snipped video file to the email or other message and press send. It should be noted that other download mediums may be supported in addition to email, with each download medium being mapped to a specific transcoding pattern (e.g., quality, size, etc.) to use when producing the offline download.

In some embodiments, video snipping and transcoding is conducted server-side (e.g., rather than locally at the client where the user is generating a video segment tag). Various tools and libraries may be triggered programmatically at the server (or, optionally, the client) which will be fed an input video file along with the appropriate instructions for manipulation. For example, codecs such as H.264, MPEG-2, etc. may be leveraged, along with appropriate resolutions and frame rates based on the target medium (e.g., including cases in which the transcoding settings such as resolution, frame rate, etc. are selected based on the anticipated device on which the video segment will be played back, such as a desktop, laptop, tablet, smartphone, etc.). Some transcoding applications also support packaged settings, such as low, medium and high quality settings, or settings for specific target devices such as mobile devices. These can be included in the configuration to initiate the download command, such as "download=low-quality."

Figure 5:
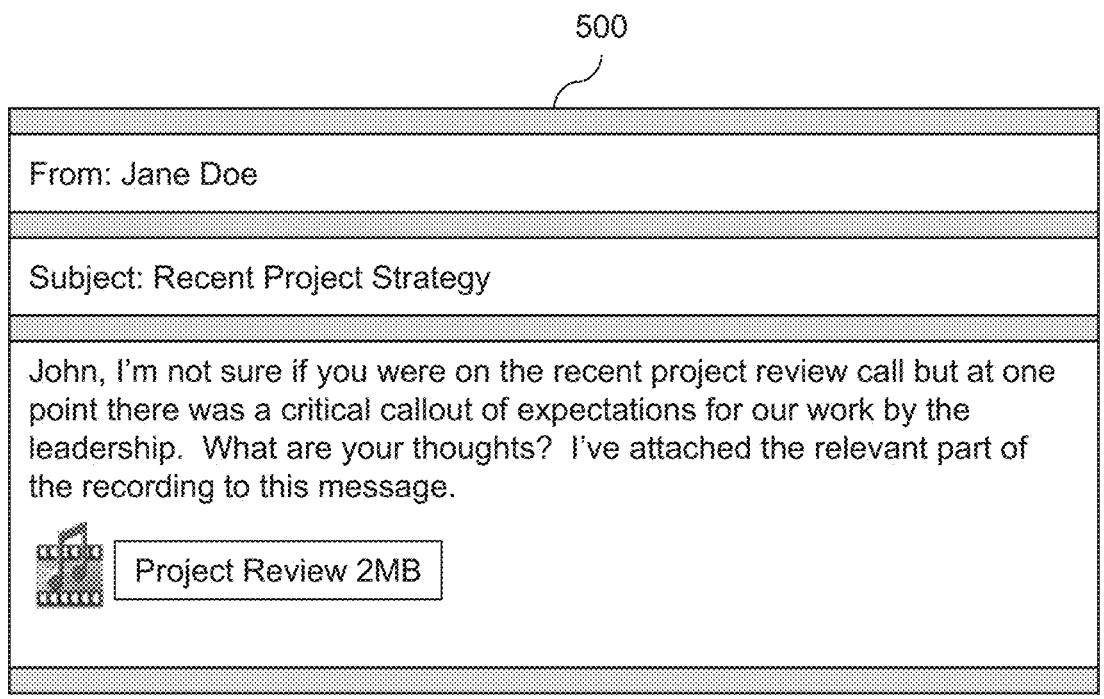
FIG. 5 shows a digital communication in which a video segment is communicated, according to an illustrative embodiment.

FIG. 5 shows an example of a message 500 (e.g., a corporate email) which has a small video attachment (e.g., a 2 MB video file) attached thereto which may be generated using the technical solutions described herein. When compared with the message 350 of FIG. 3B, in which the entire large video file (e.g., the 80 MB video file) is attached, the message 500 is much less likely to bounce or fill up the recipient's mailbox. Further, the recipient is directly focused in to the desired or relevant content of the overall video file. Thus, the message 500 includes a more meaningful sized attachment which includes only the relevant or desired content for the recipient.

The technical solutions described herein advantageously leverage user-friendly smart tagging of video segments to tagged users based on specific start and end time ranges relative to a current viewing position within a video. The tagged user will be notified of the video segment for easy and immediate viewing, thereby greatly facilitating video sharing. The technical solutions described herein further provide techniques for specifying a tagged video segment automatically, without requiring the use of a separate client-side video editor, and for segmenting a video file into a smaller derivative video to facilitate the offline sharing of video segments using various communication methods such as text messaging, instant messaging, email, etc., which are familiar to a wider segment of users.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated video segmenting and integration of video segments into digital communications will now be described in greater detail with reference to FIGS. 6 and 7. Although described in the context of system 100, these platforms may also be used to implement at least portions of other information processing systems in other embodiments.

Figure 6:
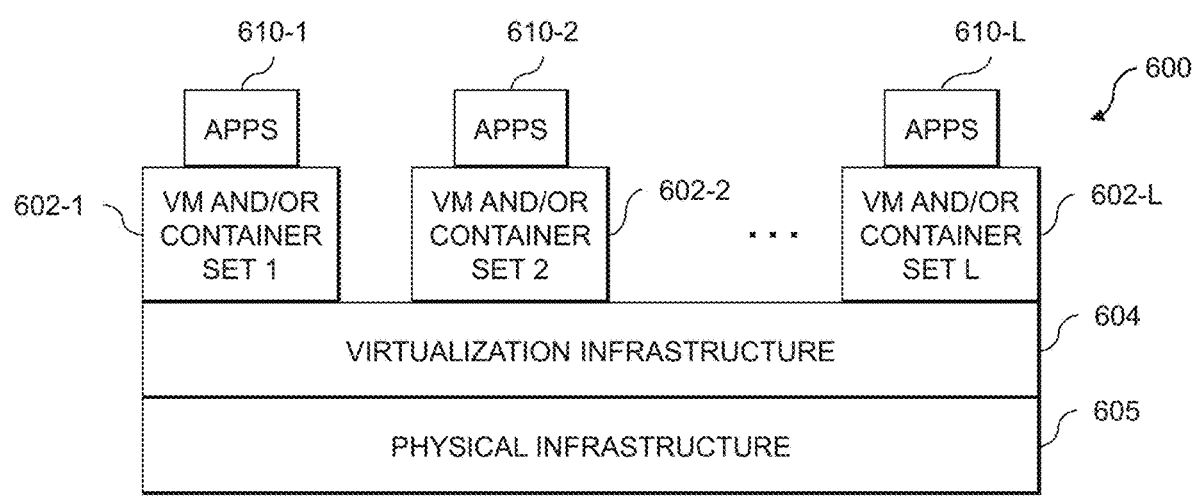
FIGS. 6 and 7 show examples of processing platforms that may be utilized to implement at least a portion of an information processing system in illustrative embodiments.
Figure 7:
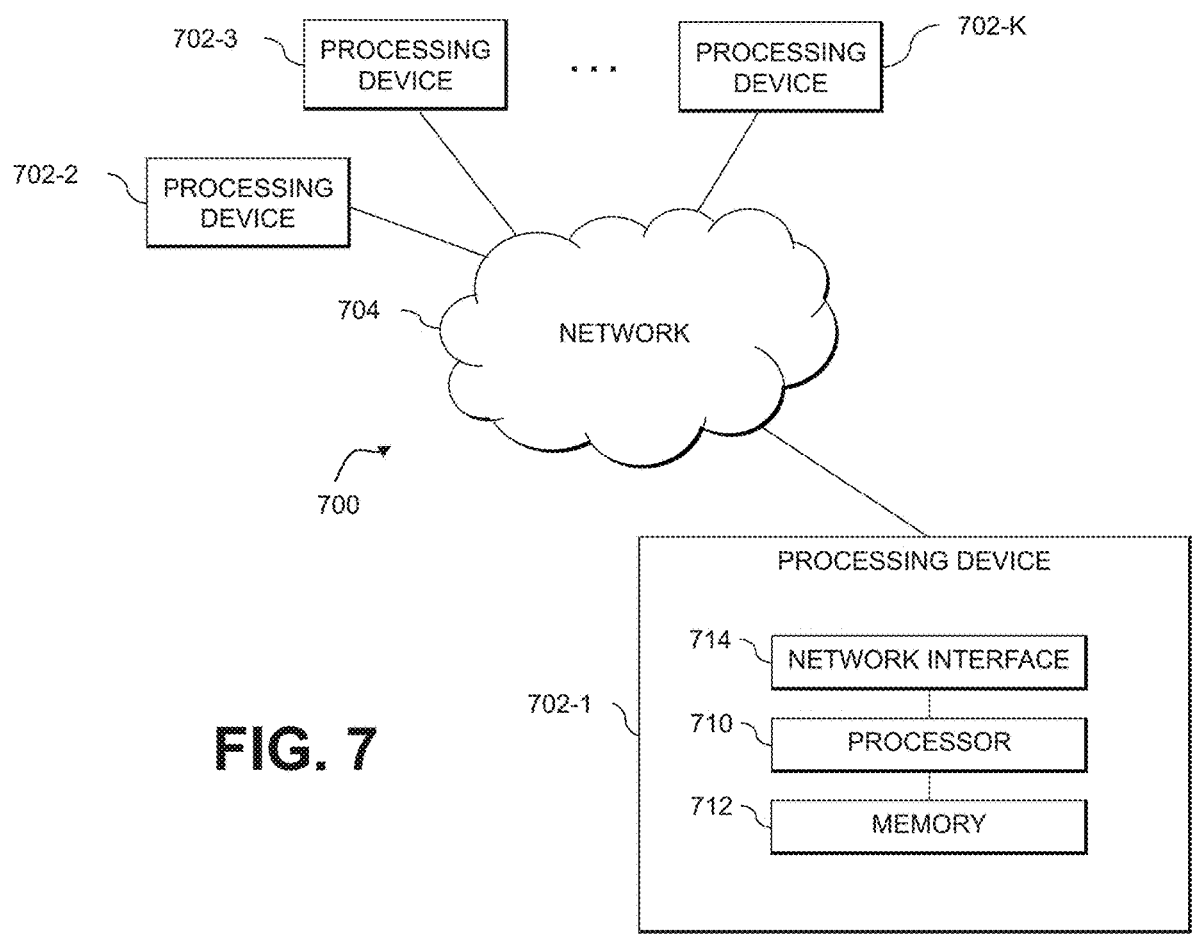

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated video segmenting and integration of video segments into digital communications as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, information technology assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to identify a video tag associated with a video;
to parse the identified video tag to determine configuration parameters for a video segment to be generated from the video, the determined configuration parameters comprising a specification of a time range for the video segment and an intended recipient of the video segment, the specified time range comprising a subset of a total length of the video;

to generate the video segment in accordance with the determined configuration parameters, wherein generating the video segment in accordance with the determined configuration parameters comprises automatically generating a separate video file for the video segment that includes the subset of the total length of the video corresponding to the specified time range;

to select one or more digital communication formats for sending the generated video segment to the intended recipient, the one or more digital communication formats being selected based at least in part on at least one of (i) one or more user preferences associated with the intended recipient and (ii) the determined configuration parameters; and to send the generated video segment to the intended recipient via the selected one or more digital communication formats.

2. The apparatus of claim 1 wherein identifying the video tag associated with the video comprises detecting creation of a video tag in a video tagging application on a client device.

3. The apparatus of claim 2 wherein the video tagging application comprises a plugin associated with a video viewer application running on the client device.

4. The apparatus of claim 1 wherein the specified time range for the video segment is defined relative to a current video position of the video in a video viewer application running on a client device.

5. The apparatus of claim 4 wherein the specified time range for the video segment comprises a bounded time range from a first time prior to the current video position of the video in the video viewer application running on the client device and a second time subsequent to the current video position of the video in the video viewer application.

6. The apparatus of claim 1 wherein generating the video segment in accordance with the determined configuration parameters comprises automatically generating the separate video file in response to detecting entry of a specified text string in a comment area of a video viewer application in which the video is opened.

7. The apparatus of claim 6 wherein the specified text string identifies: the intended recipient; and the specified time range.

8. The apparatus of claim 7 wherein the specified text string further identifies the selected one or more digital communication formats.

9. The apparatus of claim 7 wherein the specified text string further identifies a transcoding pattern to use when generating the separate video file.

10. The apparatus of claim 1 wherein automatically generating the separate video file comprises:
determining an anticipated device type of the intended recipient where the separate video file will be played back; and
selecting a transcoding pattern for generating the separate video file based at least in part on the anticipated device type of the intended recipient.

11. The apparatus of claim 10 wherein the selected transcoding pattern specifies at least one of a resolution and a frame rate for the separated video file.

12. The apparatus of claim 1 wherein automatically generating the separate video file comprises applying transcoding settings to the video, the transcoding settings being selected based at least in part on user preferences associated with one or more devices of the intended recipient.

13. The apparatus of claim 1 wherein automatically generating the separate video file comprises applying transcoding settings to the video, the transcoding settings being selected based at least in part on the selected one or more digital communication formats.

14. The apparatus of claim 1 wherein sending the generated video segment to the intended recipient comprises at least one of: downloading the separate video file for the video segment; and generating a uniform resource identifier for accessing the separate video file, wherein selection of the uniform resource identifier initiates downloading of the separate video file.

15. A computer program product comprising a non-transitory processor-readable storage medium having stored therein program code of one or more software programs, wherein the program code when executed by at least one processing device causes the at least one processing device:
to identify a video tag associated with a video;
to parse the identified video tag to determine configuration parameters for a video segment to be generated from the video, the determined configuration parameters comprising a specification of a time range for the video segment and an intended recipient of the video segment, the specified time range comprising a subset of a total length of the video;
to generate the video segment in accordance with the determined configuration parameters, wherein generating the video segment in accordance with the determined configuration parameters comprises automatically generating a separate video file for the video segment that includes the subset of the total length of the video corresponding to the specified time range;
to select one or more digital communication formats for sending the generated video segment to the intended recipient, the one or more digital communication formats being selected based at least in part on at least one of (i) one or more user preferences associated with the intended recipient and (ii) the determined configuration parameters; and
to send the generated video segment to the intended recipient via the selected one or more digital communication formats.

16. The computer program product of claim 15 wherein sending the generated video segment to the intended recipient comprises at least one of: downloading the separate video file for the video segment; and generating a uniform resource identifier for accessing the separate video file, wherein selection of the uniform resource identifier initiates downloading of the separate video file.

17. The computer program product of claim 15 wherein generating the video segment in accordance with the determined configuration parameters comprises automatically generating the separate video file in response to detecting entry of a specified text string in a comment area of a video viewer application in which the video is opened.

18. A method comprising:
identifying a video tag associated with a video;
parsing the identified video tag to determine configuration parameters for a video segment to be generated from the video, the determined configuration parameters comprising a specification of a time range for the video segment and an intended recipient of the video segment, the specified time range comprising a subset of a total length of the video;

generating the video segment in accordance with the determined configuration parameters, wherein generating the video segment in accordance with the determined configuration parameters comprises automatically generating a separate video file for the video segment that includes the subset of the total length of the video corresponding to the specified time range;

selecting one or more digital communication formats for sending the generated video segment to the intended recipient, the one or more digital communication formats being selected based at least in part on at least one of (i) one or more user preferences associated with the intended recipient and (ii) the determined configuration parameters; and sending the generated video segment to the intended recipient via the selected one or more digital communication formats;

wherein the method is performed by at least one processing device comprising a processor coupled to a memory.

19. The method of claim 18 wherein sending the generated video segment to the intended recipient comprises at least one of: downloading the separate video file for the video segment; and generating a uniform resource identifier for accessing the separate video file, wherein selection of the uniform resource identifier initiates downloading of the separate video file.

20. The method of claim 18 wherein generating the video segment in accordance with the determined configuration parameters comprises automatically generating the separate video file in response to detecting entry of a specified text string in a comment area of a video viewer application in which the video is opened.

\* \* \* \* \*